Nov. 8, 1949     C. P. HEINTZE     2,487,653
HELICOPTER DRIVE WITH RESILIENT TRANSMISSION ELEMENT

Filed May 3, 1946     3 Sheets-Sheet 1

CARL P. HEINTZE
INVENTOR

BY Gifford J. Holmes
AGENT

Nov. 8, 1949 C. P. HEINTZE 2,487,653
HELICOPTER DRIVE WITH RESILIENT TRANSMISSION ELEMENT
Filed May 3, 1946 3 Sheets-Sheet 2

CARL P. HEINTZE
INVENTOR

BY *Gifford S. Holmes*
AGENT

Nov. 8, 1949      C. P. HEINTZE      2,487,653
HELICOPTER DRIVE WITH RESILIENT TRANSMISSION ELEMENT
Filed May 3, 1946      3 Sheets-Sheet 3

CARL P. HEINTZE
INVENTOR

BY *Gifford S. Holmes*
AGENT

Patented Nov. 8, 1949

2,487,653

UNITED STATES PATENT OFFICE 2,487,653

HELICOPTER DRIVE WITH RESILIENT TRANSMISSION ELEMENT

Carl Paul Heintze, Amityville, N. Y., assignor to United Aircraft Corporation, East Hartford, Conn., a corporation of Delaware Application May 3, 1946, Serial No. 667,155

2 Claims. (Cl. 170—135.75)

This invention relates to damping means for helicopters, and more particularly comprises means placed at points of transfer of vibrations for isolating the same. Specifically, the device comprises means for suppressing or shifting phase of vibrations, and for rendering the vibrations of a different frequency where possible so that development of destructive forces due to vibrations is rendered impossible.

In carrying out my invention, I have placed means for absorbing and/or damping vibrations in the mountings of the blades of the helicopter, at the point in the craft where vertical vibrations are brought through the drive shaft adjacent the reduction gearing, and at points where vibrations will not affect attached parts beyond a predetermined degree, upon the rotor drive shaft, and upon the landing gear. The blade mounting vibration absorbers prevent modes of blade vibration in alignment with the axis of the shaft from being transferred into the rotor head for shifting phase of such vibrations, and also performing a second function of leveling bearing loads in stacked bearings. The rotor head transverse vibration isolator is mounted with respect to the craft so as to permit a predetermined degree of movement of the rotor shaft in a plane transverse of its axis. The vertical damping means in the drive shaft are placed adjacent an improved reduction gear and substantially isolates vertical vibrations. To further prevent vibrations from being transferred to a landing surface and back to the craft, a further damper in the form of a rubber spring is provided in the landing gear.

An improved rubber spring incorporating rubber in shear and operable in compression to provide a spring action is placed at several of the positions in the craft pointed out above. With this spring, a relatively low spring rate is obtained and a slow period vibration rate. With this improved spring damper, the phase of vibration of any part can be accurately controlled and rendered out of phase with another natural vibration of associated parts of the craft. Accordingly, it is possible to substantially completely prevent vibrations from becoming forced with respect to the several parts, and hence from building up in amplitude to the extent that they may become dangerous. In other words, it is possible for the first time with this invention to provide the craft at the points mentioned above with dampers arranged in such phase that vibrations are substantially isolated, and those vibrations which cannot be isolated conveniently are rendered of such phase and/or amplitude that the danger of resonance is avoided.

Accordingly, it is an object of this invention to provide an improved spring and damper for a helicopter.

Another object of this invention is to provide a device as set forth in the above object in a helicopter at points of origination or reversal of forces due to conventional structure or to combinations of elements.

Another object is to provide an improved spring damper mechanism associated with planetary reduction gearing and the drive shaft so as to isolate vibrations adjacent the gear mechanism and to thereby improve the operation of the reduction gearing.

The foregoing and other objects include the specific parts and sub-combinations and combinations of parts and will be either obvious or pointed out in the following specification and claims, and are shown in the accompanying drawings, in which:

Figure 1:
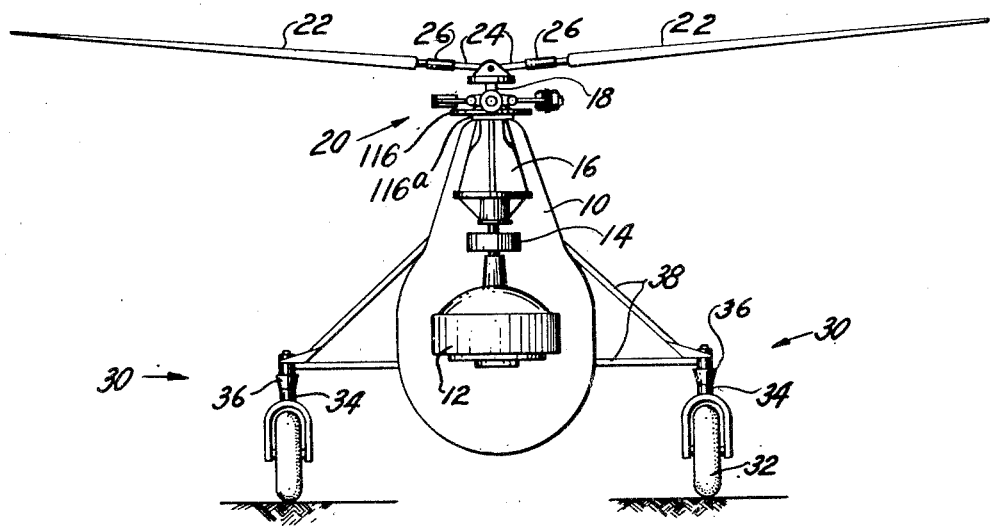
Fig. 1 is a front sectional view taken adjacent the engine of a helicopter with the rotor controls and other parts omitted for the purpose of clarity.

Referring to Fig. 1, a helicopter 10 is provided with a suitable engine 12 through which a clutch 14 turns gear reduction mechanism in a gear box 16. A drive shaft 18 extends up through a vibration isolator 20. Shaft 18 may be flexible or mounted in universal joints so that it may move laterally, restrained substantially only by the vibration isolator 20. Rotor blades 22 are mounted upon stub spars 24 secured to drive shaft 18 by improved bearing and vibration absorbing means 26 to be described more fully in connection with Fig. 2. The helicopter 10 is supported upon a surface by means of landing gear 30 which may comprise wheels 32 carried by vertical shafts 34 which in turn are supported by spring dampers 36 carried by framework 38. The spring damper 36 will be described more fully in connection with Fig. 3 and is adapted to absorb vibrations between the body and the supporting surface.

Figures 2, 3:
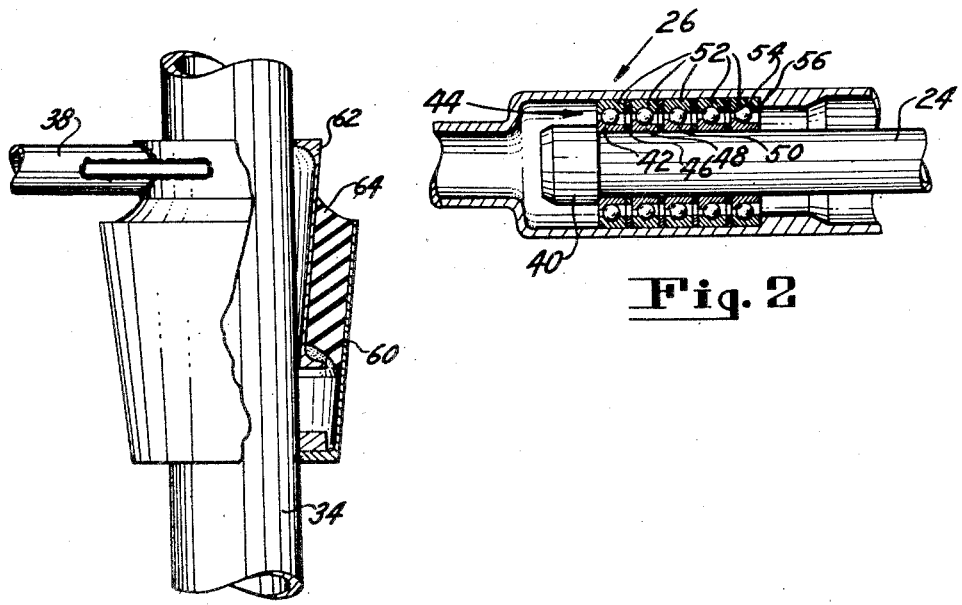
Fig. 2 is a detail view of the blade spar mounting.
Fig. 3 is a partial sectional view of a landing gear mounting and including an improved rubber spring having inherent damping properties and a relatively low spring rate.

In Fig. 2, the vibration isolator 26 is shown. The spar 24 is provided with an upset head 40 which engages the inside race 42 of a first ball race 44. The race 42 through a yieldable plastic or rubber ring 46 engages a second internal race 48. The race 48 in turn engages through another rubber ring a third race 50. Two other races are shown, spaced by rubber, and it is to be understood that more or less than two races may be provided as desired. The internal races of the thrust bearing cooperate through balls with a series of races 52 separated by rubber rings 54; and the outermost race 52 engages a shoulder 56 of the spar for the blade 22. Accordingly, as forces are exerted upon the spar with respect to the stub spar 24, these forces are dissipated in the rubber separating the different inner and outer ball races which may flex into spaces provided between them. A further function of the rubber spacers is to equalize or level the loads between the several ball races so that equal wear will occur and the damping will remain substantially constant for the entire life of the structure.

As shown in Fig. 3, the shaft 34 supporting the wheels is shown as connected with a conical walled cup 60 which surrounds an inner conical walled cup 62 that is connected with the landing gear supports 38. A rubber ring is suitably secured or bonded between the two cups, or sleeves, 60 and 62. The sides of the cups 60 and 62 are substantially parallel to each other but as the cup 60 is moved upwardly towards the cup 62, the rubber 64 is compressed and also stressed in shear. The angle of the walls of the cups 60 and 62 can be so selected that a relatively long travel with respect to the two cups can occur and a relatively low spring rate is attained by varying the thickness of the rubber 64. Such structure has the ability of absorbing relatively high loads, of dissipating energy, and of not returning the force at a high rate, or speed to obtain a phase shift of vibration and reduction in amplitude of an applied force.

Figure 4:
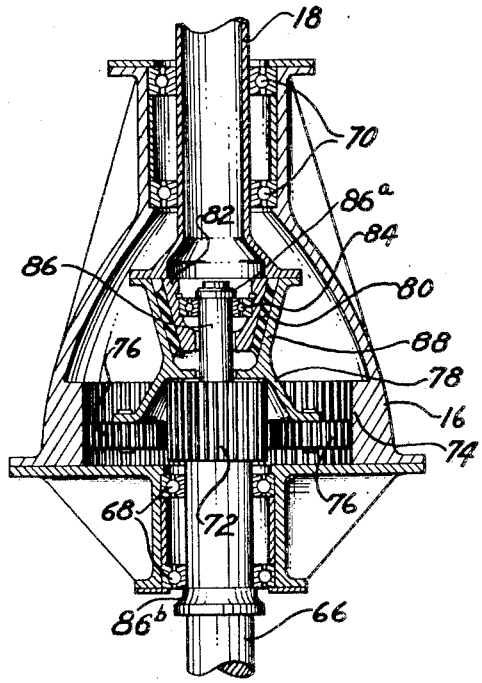
Fig. 4 is a sectional view of the reduction gearing for driving the rotor of this invention and including a rubber spring damper substantially the same as that shown in Fig. 3.

As shown in Fig. 4, the gear box, or housing, 16 supports a low torque, high speed drive shaft 66 in bearings 68 and a high torque, low speed upper drive shaft 18 in radial bearings 70 the inner races of which may be a sliding fit to permit the shaft 18 to move up and down. The shaft 66 turns a pinion 72, the teeth of which are relatively wide. The housing 16 supports an internally toothed ring gear 74, also having relatively wide teeth. Planet gears 76 are rotated by the pinion 72, and roll upon the teeth of the ring gear 74, so that the planet gears 76 turn the shaft 18 at low speed. A spider 78 connects with the planet gears 76 and with the shaft 18. The shaft 18 can move up, as a result of lift forces exerted by the rotor, from the position shown in Fig. 4 and also can move up and down due to vertical vibration forces caused by the rotor blades 22, and the teeth of the planet gears 76 during this movement will slide up and down along the teeth of the pinion 72 and the ring gear 74. A rubber damper spring 80, similar to that described in connection with Fig. 3, has an external conical walled cup 82 bonded thereto and supported upon a bearing 84 by an extension 86 of the shaft 66. The shaft extension 86 has a terminal shoulder 86a which engages the top of bearing 84 and limits the upward movement of cup 82, since shaft 66 is prevented from upward movement by engagement of shoulder 86b with the fixed inner race of lower bearing 68. The spider 78 is formed into an internal conical walled cup at 88 bonded or otherwise suitably secured to the rubber spring 80. As the rotor shaft 18 moves up and down, it will pull the spider 78 up and down to put the rubber 80 in compression and tension and also to stress it in shear so that the vibrations fed down from the rotor are damped by the rubber and the force of lift of the craft is absorbed in the rubber. Accordingly, any transient virations are substantially isolated by the rubber and are not transferred to the body of the craft which supports the gear housing 16.

Figure 5:
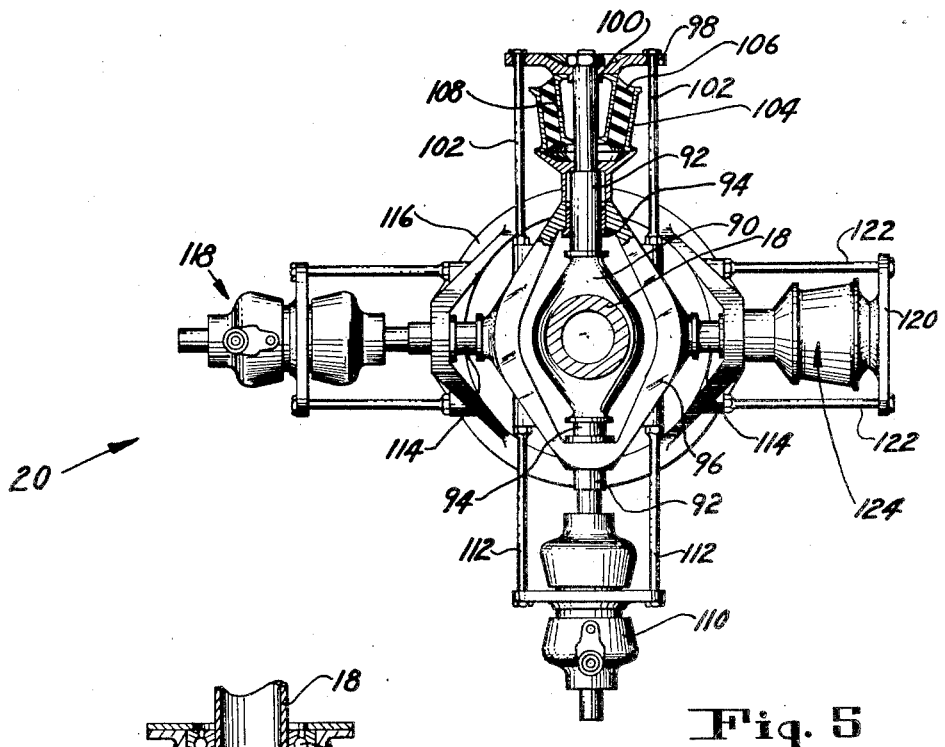
Fig. 5 is a plan view, with parts in section, of the rotor head vibration isolator including a rubber spring such as shown in Fig. 3 but associated with hydraulic dampers.

In Fig. 5, the vibration isolator for the rotor drive shaft is shown. The flexible drive shaft 18 extends up through and is rotatable in a collar 90, which collar is connected with slide rods 92 on each side, which rods pass through bearings 94 in an outer collar 96. The upper rod 92 is connected at its end to a span rod 98 slidably at the midpoint 100 thereof. The span rod 98 in turn is mounted slidably on rods 102 which are connected to the outer ring 96. The outer ring 96 also connects with an outer conical cup 104 bonded or otherwise suitably secured with a rubber spring 106. An inner conical cup 108 is bonded or otherwise suitably secured to the rubber spring 106, and also secured to the span rod 98. As the drive shaft 18 moves downwardly as viewed in Fig. 5, the rod 92 will pull down the cup 108 to compress and thereby stress in shear the rubber 106. An hydraulic damper 110 of any usual construction is connected to the inner ring 90 by the lower slide rod 92, and to the outer ring 96 by rods 112, and operates as a conventional two-way motion speed restrictor to further retard the speed of vibration of the shaft 18. Hence, the vibration period of the rotor transverse of its plane of rotation is of a very low order, but the drive shaft 18 may be permitted to move slowly in such sense.

The outer collar 96 is secured to the body of the aircraft by means of slidable rods 114 journaled in a ring 116 which in turn is fixed to the body of the craft. Herein ring 116 is shown as fixed to a plate 116a on the top of the gear box 16. An hydraulic damper 118 similar to the damper 110 is connected through its casing to the fixed ring 116. The piston, not shown, in the damper 118 connects with the rod 114 and the outer collar 96. The right hand slide rod 114 connects with a span bar 120 secured by rods 122 to the fixed ring 116. A rubber spring damper generally indicated at 124 and similar to that described above is provided so that right and left movements of the shaft 18 are transferred through the slide rod 92, bearings 94, the outer ring 96 and the slide rods 114 to the damper 118 and the rubber spring 124. Hence, the drive shaft 18 is free to move substantially in any direction in azimuth and the vibrations are damped in all senses.

Figure 6:
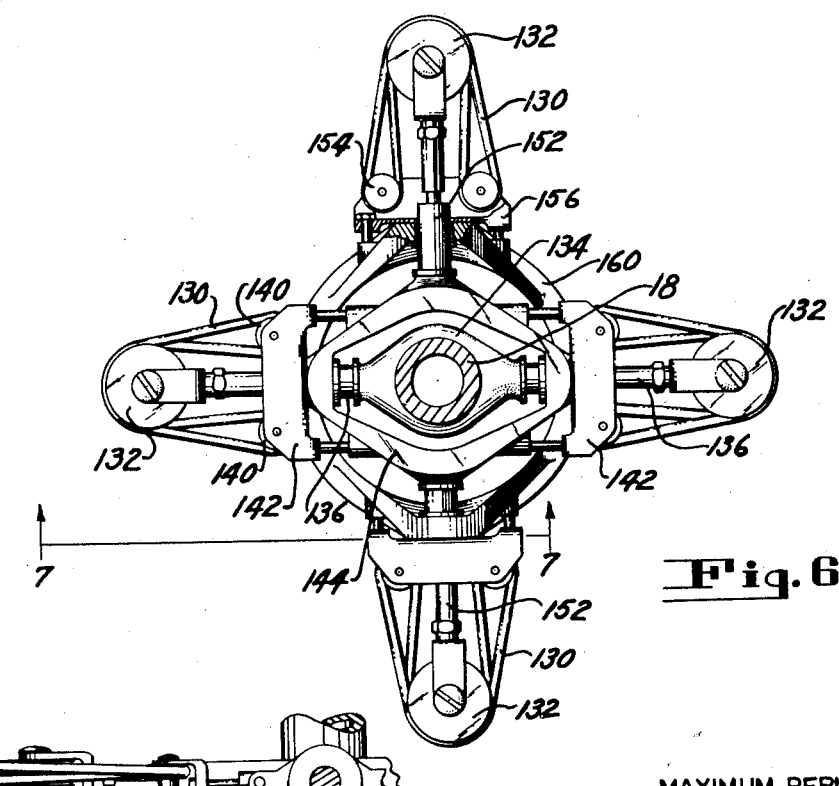
Fig. 6 is a view similar to Fig. 5 but showing a modified form of rubber spring.
Figure 7:
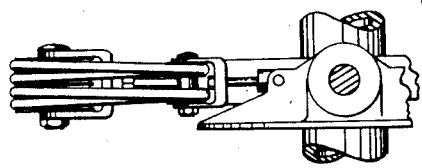
Fig. 7 is a semi-sectional view taken on the line 7—7 of Fig. 6.

Fig. 6 shows a modified support for the drive shaft 18 and including rubber shock chord 130 connected over pulleys 132. The construction is generally the same as described above except that the rubber chord and pulleys replace the rubber springs and hydraulic dampers shown in Fig. 5. The drive shaft 18 passes through an inner collar 134 which has slide rods 136 mounting the pulleys 132 at their ends, which rods may move to the right or left to move pulleys 132. The shock chord 130 is laid over the pulleys 132 and pulleys 140 carried in a channel 142 mounted upon an outer collar 144. Thus, the pulleys 132 and 140 may be moved with respect to each other by lateral movements of the drive shaft 18 to stretch the shock chord 130. The outer ring 144 is provided with slide rods 152 which mount other pulleys 132. The shock chord 130 coupled with these pulleys is mounted on other pulleys 154 in channels 156 connected with a ring 160 fixed to the body of the craft. The function of this device is substantially the same as that described in connection with Fig. 5, that is, motion is permitted of the drive shaft 18 but the shock chord 130 restrains this motion and renders it of relatively low period to damp vibrations.

Figure 8:
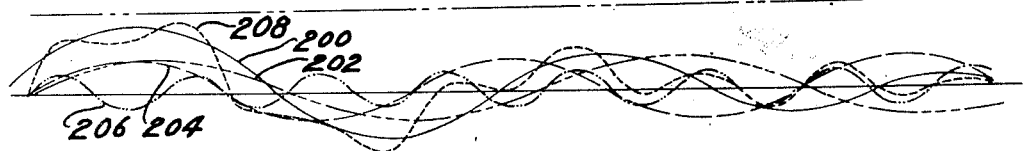
Fig. 8 is a graph of vibrations resulting from the use of the several damping means in the different portions of the craft.

Fig. 8 represents a damping curve with several periods of vibration provided in the several damper mounts in the helicopter. For example, the line 200 may represent the vibrations permitted by the rotor head vibration isolator which is usually a damped curve. The line 202 may represent the damping due to landing gear mounts as described in connection with Fig. 3. The line 204 may represent the damping in the gear mechanism as shown in Fig. 4. Line 206 may represent the damping provided in the rotor blade mounting such as shown in Fig. 2. The line 208 is an alegbraic addition of these vibrations as damped with respect to each other, and it is to be noted that the several phases are such that there is at no time a substantial addition of forces. Hence, by the use of the different damping means at places in the helicopter which vibrations may be isolated between separate parts of the structure, the magnitude of any disturbing forces can be so controlled and restricted that at no time will these vibrations exceed a predetermined maximum, such as represented at the left hand side of the vibrations in Fig. 8 where all vibrations have an in phase maximum.

Figure 9:
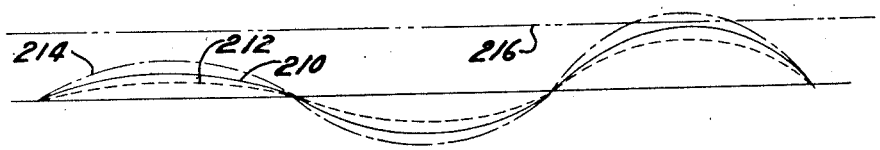
Fig. 9 is a graph of two equal period vibrations in which no phase shift nor frequency change is provided, to illustrate resonance.

Fig. 9 is a chart representing what can happen in undamped structures. The line 210 represents a first vibration which could be in the rotor head, for example. The line 212 represents vibrations which could build up in the landing gear, for example. These two vibrations are shown in phase and the summation of the vibrations is represented at 214. With such undamped structure, the vibrations would be forced and hence increasing in magnitude as shown at the right side of the chart in excess of the maximum permissible amplitude represented by the line 216. It is such condition that my invention corrects.

While I have shown and described one preferred embodiment of my invention and different details of construction for obtaining the desired improved result, it is to be understood that other modifications will occur to those skilled in the art. Hence, I wish not to be limited in my invention only to that form shown and described but by the spirit of the subjoined claims.

I claim:

1. In a helicopter including a body having an engine mounted therein and a rotor driven by said engine, a gear casing fixed in said body, an engine driven shaft rotatably mounted in said casing and held thereby against substantial axial movement, an inner conical member mounted on said shaft for rotation relative thereto but held fixed thereon against axial movement, said member having upwardly and outwardly flared sidewalls, a coaxial rotor shaft rotatably mounted in said casing and free for a substantial amount of axial movement, an outer conical member fixed on said rotor shaft so as to move axially therewith having upwardly and outwardly flared walls concentric with the flared walls of said inner member and spaced apart laterally therefrom, a rubber-like body of resilient material disposed in the space between the sidewalls of said members and bonded to the confronting surfaces thereof, said body of resilient material being stressed partly in compression and partly in shear of the material thereof as a result of lift forces exerted by the rotor on said rotor shaft.

2. In a helicopter including a body having an engine mounted therein and a rotor driven by said engine, a gear casing fixed in said body, an engine driven shaft rotatably mounted in said casing having a pinion in said casing, said casing having an internally toothed ring gear surrounding said pinion, and said pinion and ring gear both having elongated teeth, an inner conical member rotatably mounted on said shaft having upwardly and outwardly inclined walls, said shaft being supported in said casing against substantial axial movement and having means for preventing upward displacement of said conical member, a rotor shaft assembly journaled in said casing for limited axial movement relative thereto, said assembly including an outer conical member provided with upwardly and outwardly inclined sidewalls spaced apart laterally from the walls of said inner conical member, a body of rubber-like material interposed between said conical walls of said members and bonded to the confronting surfaces of the latter, and a spider on said rotor shaft carrying a planetary gear meshing with said pinion and ring gear.

CARL PAUL HEINTZE.

REFERENCES CITED

The following references are of record in the file of this patent:

UNITED STATES PATENTS

| Number | Name | Date |
|---|---|---|
| 758,457 | McFarlane | Apr. 26, 1904 |
| 1,229,417 | Daft | June 12, 1917 |
| 1,795,816 | Wood | Mar. 10, 1931 |
| 1,822,026 | Guy | Sept. 8, 1931 |
| 2,202,615 | Barenyi | May 28, 1940 |
| 2,261,954 | Browne | Nov. 11, 1941 |
| 2,339,877 | Pullin | Jan. 25, 1944 |
| 2,351,427 | Henshaw | June 13, 1944 |
| 2,366,236 | Clark | Jan. 2, 1945 |
| 2,395,143 | Prewitt | Feb. 19, 1946 |
| 2,420,452 | Stachovsky | May 13, 1947 |